United States Patent
Almgren et al.

[11] Patent Number: 6,112,082
[45] Date of Patent: *Aug. 29, 2000

[54] METHOD AND AN ARRANGEMENT RELATING TO TELECOMMUNICATIONS SYSTEM

[75] Inventors: K. Magnus Almgren; Harald Kallin, both of Sollentuna; Szerker Magnusson, Stockholm, all of Sweden

[73] Assignee: Telefonaktiebolaget LM Ericsson, Stockholm, Sweden

[*] Notice: This patent is subject to a terminal disclaimer.

[21] Appl. No.: 09/162,123

[22] Filed: Sep. 29, 1998

Related U.S. Application Data

[63] Continuation-in-part of application No. 08/939,760, Sep. 29, 1997.

[51] Int. Cl.[7] .................................................. H04Q 7/20
[52] U.S. Cl. .......................... 455/425; 455/423; 455/514
[58] Field of Search .................................... 455/446, 447, 455/63, 69, 62, 67.1, 67.3, 522, 501, 513, 514, 422, 423, 436, 437, 442

[56] References Cited

U.S. PATENT DOCUMENTS

| | | | |
|---|---|---|---|
| 4,613,990 | 9/1986 | Halpern | 455/436 |
| 5,157,709 | 10/1992 | Ohteru . | |
| 5,184,349 | 2/1993 | Riordan | 370/347 |
| 5,218,648 | 6/1993 | Wells et al. | 382/103 |
| 5,398,276 | 3/1995 | Lemke et al. | 379/21 |
| 5,551,064 | 8/1996 | Nobbe et al. | 455/62 |
| 5,561,839 | 10/1996 | Osterberg et al. | 455/446 |
| 5,574,981 | 11/1996 | Ahonen | 455/67.4 |
| 5,603,092 | 2/1997 | Stjernholm . | |
| 5,799,005 | 8/1998 | Soliman | 370/335 |
| 5,848,060 | 12/1998 | Dent | 370/281 |
| 5,854,981 | 12/1998 | Wallstedt et al. | 455/439 |
| 5,907,597 | 5/1999 | Mark | 379/93.03 |

FOREIGN PATENT DOCUMENTS

| | | |
|---|---|---|
| 0458768 | 11/1991 | European Pat. Off. . |
| WO 9832302 | 7/1998 | WIPO . |

*Primary Examiner*—Dwayne D. Bost
*Assistant Examiner*—Sonny Trinh
*Attorney, Agent, or Firm*—Burns, Doane, Swecker & Mathis, L.L.P.

[57] ABSTRACT

The present invention relates to a method of compiling transmitter-to-receiver relationships in a radio system. The radio system includes at least two receivers (B48, B42) and at least one transmitter (MS1) located in at least one radio coverage area (C42) of the receivers (B42). The method for a single transmitter (MS1) comprises the steps of:

sending a signal (ARM) having known power (Put) on a transmission channel allocated to said transmitter (MS1);

measuring in at least one of the receivers (B48, B42) the power received (S48, S42) from the transmitted signal (2, ACCESS), it being guaranteed that the signal will be a solitary signal upon reception;

calculating the amplification (g^48, g^42) of the signal (ARM) received in the receiver; and storing the calculated amplification (g^48, g^42) in a storage location in the radio system.

12 Claims, 5 Drawing Sheets

|     | C39 | C40 | C41 | C42 | C43 | C44 | C45 | C46 | C47 | C48 | C49 | C50 | C51 | C52 | C53 | C54 |
|-----|-----|-----|-----|-----|-----|-----|-----|-----|-----|-----|-----|-----|-----|-----|-----|-----|
| B39 |     |     |     | ◿   |     |     |     |     |     |     |     |     |     |     |     |     |
| B40 |     |     |     | ◿   |     |     |     |     |     |     |     |     |     |     |     |     |
| B41 |     |     |     | ◿   |     |     |     |     |     |     |     |     |     |     |     |     |
| B42 |     |     |     | ◿   |     |     |     |     |     |     |     |     |     |     |     |     |
| B43 |     |     |     | ◿   |     |     |     |     |     |     |     |     |     |     |     |     |
| B44 |     |     |     | ◿   |     |     |     |     |     |     |     |     |     |     |     |     |
| B45 |     |     |     | ◿   |     |     |     |     |     |     |     |     |     |     |     |     |
| B46 |     |     |     | ◿   |     |     |     |     |     |     |     |     |     |     |     |     |
| B47 |     |     |     | ◿   |     |     |     |     |     |     |     |     |     |     |     |     |
| B48 | ◿   | ◿   | ◿   | ◿   | ◿   | ◿   | ◿   | ◿   | ◿   | ◿   | ◿   | ◿   | ◿   | ◿   | ◿   | ◿   |
| B49 |     |     |     | ◿   |     |     |     |     |     |     |     |     |     |     |     |     |
| B50 |     |     |     | ◿   |     |     |     |     |     |     |     |     |     |     |     |     |
| B51 |     |     |     | ◿   |     |     |     |     |     |     |     |     |     |     |     |     |
| B52 |     |     |     | ◿   |     |     |     |     |     |     |     |     |     |     |     |     |
| B53 |     |     |     | ◿   |     |     |     |     |     |     |     |     |     |     |     |     |
| B54 |     |     |     | ◿   |     |     |     |     |     |     |     |     |     |     |     |     |

Fig. 4b

Fig. 5

METHOD AND AN ARRANGEMENT RELATING TO TELECOMMUNICATIONS SYSTEM

PRIOR INVENTION

The present invention is a Continuation-in-Part claiming priority from U.S. application Ser. No. 08/939,760 filed on Sep. 29, 1997.

FIELD OF INVENTION

The present invention relates to a method and to an arrangement for compiling the transmitter-receiver relationship in a radio system.

BACKGROUND ART

A radio connection can be established between a transmitter and a receiver in a radio communications system. The connection is two-directional, and one refers to a downlink that forms the connection in a direction away from a base station in the radio communications system to a mobile station, and an uplink which forms the connection in the opposite direction, i.e. from the mobile station to the base station. Transmission and reception of radio traffic for different connections takes place on radio channels that can be defined by a given frequency in an FDMA system (Frequency Division Multiple Access) or by a combination of a given frequency and a given time slot in a system that uses TDMA (Time Division Multiple Access).

The radio channels available in an FDMA system and a TDMA system can be reused. Thus, the signal strength received in a receiver on a radio channel may include a signal strength contribution from all transmitters that transmit on this radio channel. The distance between two transmitters that transmit on one and the same radio channel, the so-called repetitive distance will preferably be sufficiently great to ensure that the desired received signal is not subjected unduly to co-channel interference.

By interference is meant the sum of the signal strengths of all undesirable signals received on the radio channel used. These undesirable signals derive primarily from other connections that use the same radio channel in neighboring cells of the radio communications system.

A poor connection of unacceptable quality in a radio communications system may be due, among other things, to the fact that the ratio between the signal strength of the desired signal and the interference is too low. The signal strength ratio between the desired signal (carrier) and the disturbing signals (interference) is normally given as the C/I ratio (Carrier to Interference ratio) and is a measurement of channel quality.

The U.S. Patent Specification U.S. Pat. No. 5,157,709—Ohteru, teaches an adaptive radio communications system that includes a control station which sets up an interference matrix for the interference values between base stations. Each base station measures power levels on signals that are received on unoccupied radio channels. Information relating to received power levels on unoccupied radio channels is forwarded to the control station together with the radio channel and base station identity. The control station generates on the basis of this information an interference matrix which is used in adaptive allocation of channels to the base stations. U.S. Patent Specification U.S. Pat. No. 5,603,092 Stjernholm, also teaches a method of estimating interference. The interference is used for statistical evaluation. Measuring of traffic in other cells is carried out in both cases, i.e. in both Ohteru and Stjernholm. When frequencies are repeated by different transmitters located at different distances from a receiver, the strength of the signal received from these transmitters will vary. When several transmitters send simultaneously on one and the same channel, it is normally only possible to identify the strongest signal. The result is that only a few observations are obtained from remote cells. The method to Ohteru involves creating an interference matrix that contains information relating to mutually interfering cells and how often such interference occurs. The method does not, on the other hand, involve transmitter-receiver amplification between the cells. The method taught by Stjernholm involves measuring the magnitude of the interference. The magnitude of the interference magnitude, however, will depend on transmission power. one drawback in this regard is that dynamic power regulation results in difficulties in power level distribution, when said level changes. Furthermore, difficulties arise in measuring the relationship of a receiver to a remote transmitter when the power output of these transmitters is maintained at a low level in order to avoid interference situations.

When creating a frequency plan in a radio system for instance, it is desirable to know what affect an individual transmitter in a relatively wide area in the system will have on receivers in the system. It is also desirable to compile in a simple fashion information where relationships between each individual transmitter, irrespective of its transmitted power, and each receiver can be predicted.

SUMMARY OF THE INVENTION

The present invention addresses the problem of compiling information that is indicative of how an individual transmitter in a radio system will influence a receiver in the system, i.e. establish a relationship between a transmitter and receiver, in a simple manner. Another problem addressed by the invention is to establish how one or more different transmitters in a radio system each influence one or more receivers in the system, and to compile this information in a form suited for later use.

The problems addressed by the invention are solved by measuring the amplification of a signal transmitted with known power by a transmitter. Upon reception in one or more receivers, the signal is guaranteed to be a solitary signal, i.e. a lone signal, received at a given point in time or at a given geographical position. The method is repeated for several transmitters and the values measured are combined in a central unit in the system.

More specifically, the problems are solved by sending from a transmitter a radio signal of known power. The signal is guaranteed to be a solitary signal by choosing a certain type of signal for reception, this signal type being sent solely during a relatively short period on a channel which is essentially silent. The power of the signal is measured upon reception in one or more receivers and the amplification is calculated for each received signal as the quotient between received power and transmitted power. The calculated amplification value is stored in a storage location together with information disclosing the whereabouts of the transmitter in the radio system when transmitting the signal. The method is repeated with other transmitters in the system. A matrix comprising relationships between transmitter and receiver is stored in a central unit in the system.

An object of the present invention is to create in a simple manner a dynamic matrix that shows the relationships between transmitters that are located in different radio trafficked areas in a radio system and receivers in said system. The matrix is used as a measurement of the probability of a transmitter in the radio trafficked area relating to the receiver in a certain way on a later occasion. The matrix is used to improve system performance.

One advantage of the invention resides in the simplicity of creating the dynamic transmitter/receiver relationship matrix. The relationship matrix can then be used in connection with frequency planning for instance, subsequent to studying the stored measured values in the relationship matrix and subsequent to determining the probable effect in the system of choosing different frequencies. Alternatively, lists of neighboring cells, or adjacent cells, can be created in a mobile system subsequent to reading from the matrix the relationship of transmitters to base stations when these transmitters were located in different cell areas of the system. Furthermore, adaptive channel allocation can be made in a radio system subsequent to studying the stored values in the matrix and thereafter determining the interference effect in the system with different channel selections when establishing a connection between a transmitter and a receiver.

Another advantage afforded by the invention is that the relational matrix can be established even when low transmitter powers are normally desired, since the transmission of the solitary signal will not interfere with other transmissions. This enables the transmitters to have a higher output power, which, in turn, enables the relational matrix to be created for wide geographical areas.

The invention will now be described in more detail with reference to exemplifying embodiments thereof and also with reference to the accompanying drawings.

DETAILED DESCRIPTION OF PREFERRED EMBODIMENTS

Although it is assumed in the following description of the inventive method and of the inventive arrangement that the radio communications system is a DAMPS system, the invention can also be applied to other radio communication systems, analogue systems, such as NMT, AMPS systems and also digital systems, such as GSM and PDC systems. The object of the invention is to generate a matrix that contains information as to how different radio stations located in different cell areas of a radio system will affect base stations in the system. The information is then used for frequency planning or for generating lists of neighboring or adjacent cells, for instance.

Figure 1:
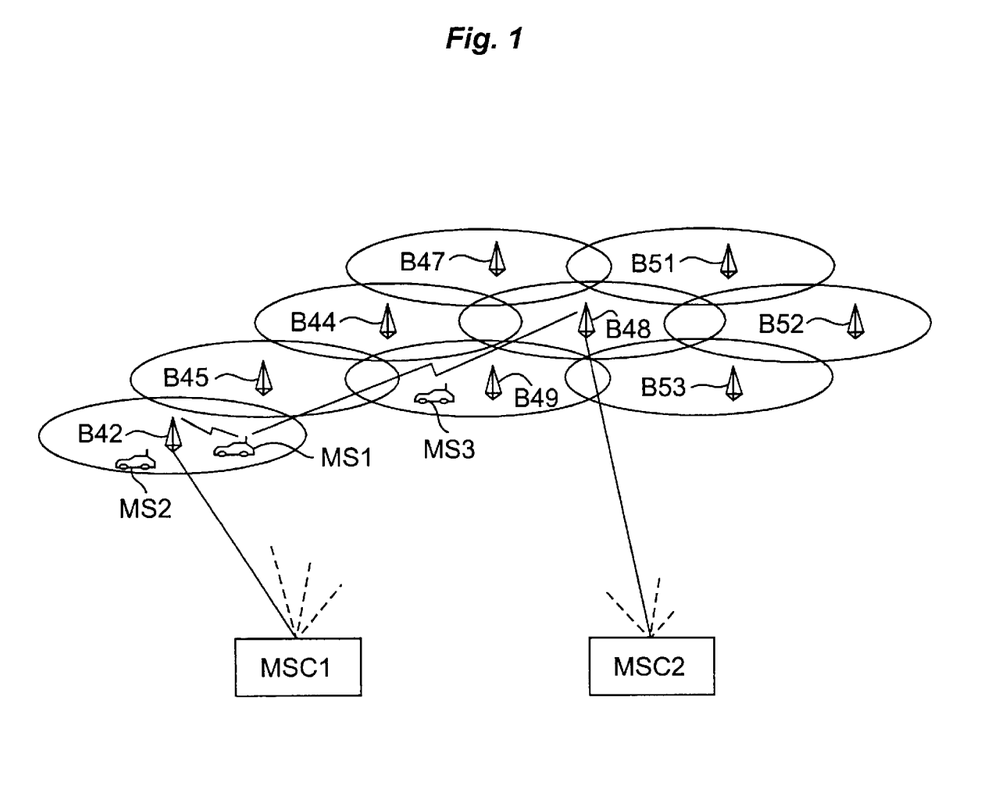
FIG. 1 is a schematic view over part of a mobile radio communications system.

FIG. 1 is a schematic illustration of part of a radio communications system. The radio communications system includes a number of radio stations between which radio communication can take place over radio channels. The radio system is shown as a cellular mobile radio network of the DAMPS kind that includes different base stations. only a few of the total number of base stations in the network are shown in FIG. 1a, e.g. base stations B42, B48. Each base station has a range within which radio communication with mobile radio stations MS1, MS2 and MS3 can be carried out. The radio coverage area of the base stations is referred to as the trafficked areas and is shown in FIG. 1 in the form of ovals marked around each base station. The base stations are handled by mobile services switching centers MSC1 and MSC2. FIG. 1a and following Figures show only those units of a complete mobile radio system that have been considered significant to the invention. A first mobile MSI is located within the radio coverage area of a base station B42. This base station is referred to hereinafter as the primary base station B42. Radio signals from the first mobile MS1 can be captured by the primary base station B42, wherewith the first mobile MS1 has a radio relationship to the primary base station B42. This radio relationship has been shown in FIG. 1 with a lightening symbol between the mobile MS1 and the base station B42. Another radio relationship has been indicated in FIG. 1 between the first mobile MS1 and another base station B48, the secondary base station B48. Although not shown, other secondary radio relationships occur between the mobile and other base stations. The various radio relationships will be explained in more detail further on in the text.

Figure 2:
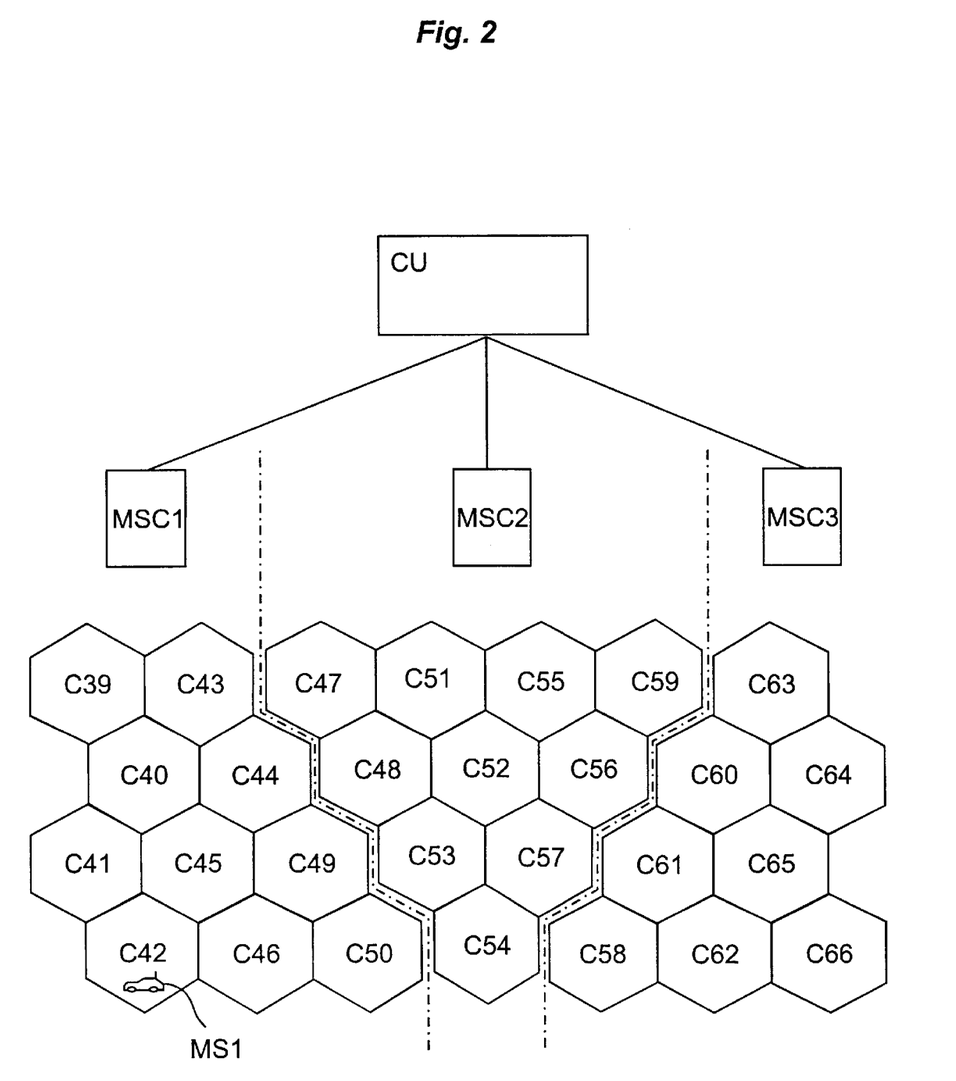
FIG. 2 illustrates cell areas, of which some are shown in FIG. 1, and a number of switching centers.

FIG. 2 illustrates radio coverage areas, cells, for those base stations that are included in different cell areas handled by different mobile switching centers MSC1, MSC2, MSC3 in the radio system. Only a few of the large number of switching centers and cells that are normally contained in a DAMPS system have been shown in the Figure. The cells C39–C66 shown in the Figure have been drawn as hexagons. The cells represent symbolically geographical areas covered by the base stations. The cells that belong to the base stations illustrated in FIG. 1 have also been shown in FIG. 2. For instance, the cells belonging to the primary base station B42 and to the secondary base station B48 have been marked in FIG. 2. These cells are referred to as the primary cell C42 and the secondary cell C48. The aforementioned first mobile radio station MS1 is found in FIG. 2 within the primary cell C42. The cell areas/base stations handled by the various mobile switching centers MSC1, MSC2 and MSC3 have been marked in the Figures. The boundaries between the various handling areas have been marked with broken lines between respective cell areas. It will be evident from the FIG. 2 that the primary cell C42 is handled by the first mobile switching center MSC1 and that the secondary cell C48 is handled by the second mobile switching center MSC2.

Figure 3:
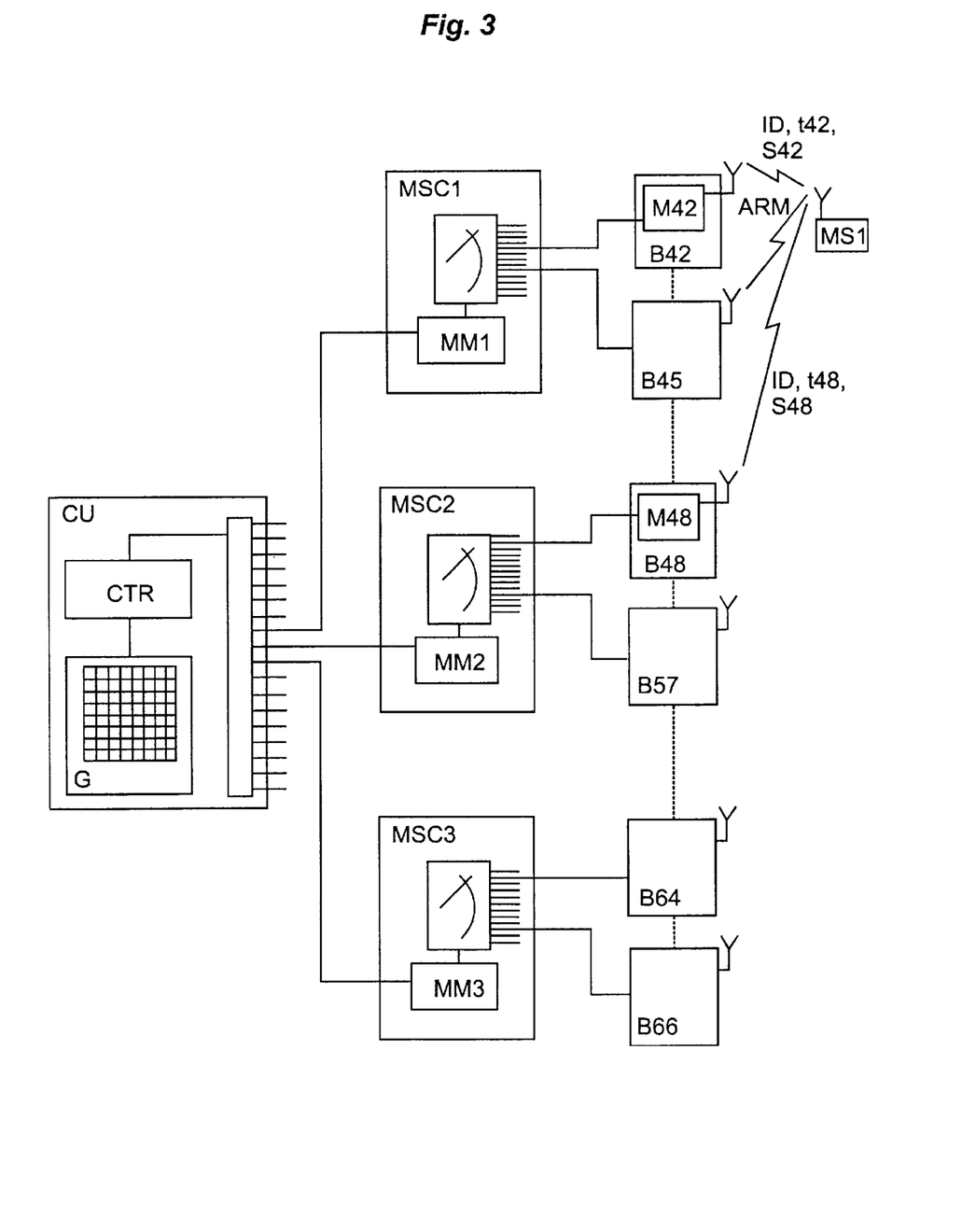
FIG. 3 is a block schematic illustrating a I mobile telecommunications system in which the inventive method is applied.

An exemplifying embodiment of the invention will now be described with reference to FIG. 3. The primary base station B42 and the secondary base station B48 are shown in the Figure. The chain lines drawn between the base stations in FIG. 3 indicate that all base stations in the mobile radio system are included, even though only a few base stations B42, B45, B48, B57, BG4 and BG6 have been drawn in the Figure. Of all the switching centers included in the mobile radio system, only three switching centers MSC1, MSC2 and MSC3 have been drawn in the Figure, these switching centers also being shown in FIG. 2. FIG. 3 shows that a first mobile switching center MSC1 is connected to various base stations, of which the primary base station B42 is one. Similarly, the secondary base station B48 is one of the base stations that are connected to a second mobile switching center MSC2. All switching centers are connected to a central unit CU, which will be explained in more detail hereinafter. In the illustrated embodiment, each base station includes equipment for measuring signals on radio channels that are transmitted on all the different frequencies that occur in the radio system. Radio signals that are transmitted by transmitters on the different frequencies can be registered in the receiver and the power measured. The strength of received signals depends on the transmission powers of the transmitters that transmit on the radio channel in question, and on the extent to which the various signals have been attenuated on their way from the transmitters to the receiver. This attenuation depends, among other things, on the distance, direction and topology between transmitter and receiver. Attenuation can be seen as the inverse of radio channel amplification. This amplification assumes the values between 0 and 1, i.e. the power decreases along the path from the transmitter to the receiver. Thus, if a signal is attenuated five times, the amplification will be 0.2. Amplification can also be expressed in decibels, in which case the values become negative. The factor by which the transmitted signal strength is multiplied in order to obtain the received signal strength is called here the amplification factor. An amplification factor can assume the values between 0 and 1. Amplification factors will be used in the following description as a measurement of the attenuation in the system. The value of the power of a received, selected radio signal and other information sent from the mobile are stored in a storage location M42, M48 in respective base stations B42, B48. Each of the mobile switching centres MSC1–MSC3 includes a respective storage units MM1, MM2 and MM3 to which information that has earlier been stored in the memory locations M42, M48 in respective base stations B42, B48 can be transferred. Each of the mobile switching centres MSC1, MSC2 and MSC3 is connected to the central unit CU. The central unit includes a matrix storage G into which the information earlier stored in the storage units MM1, MM2 can be transferred. The central unit CU also includes a control unit CTR which commands fetching of information from the switching centres to the central unit CU and calculates amplification values for different received powers.

The inventive method begins with the choice of the type of radio signal to be received from the mobiles. The message chosen to be received in the illustrated case and to be measured is an access request message ARM. The access request message is sent by the mobile on a control channel, either when registering the mobile or when access is desired in setting-up a call connection. An access request message also includes the identity of the mobile. The access request message ARM is of very short duration and there is very little likelihood of more than one message being sent simultaneously on one and the same frequency in one and the same limited geographical area. After having chosen the type of signal to be received and measured, the control unit CTR in the central unit CU sends a start message to all mobile switching centers MSC2–MSC3 in the system. The mobile switching centers then instruct all base stations to read information on all control channels in the system, so as to seize or catch access request messages ARM sent from transmitters in the radio system. The method thereafter comprises the following steps:

The first mobile MS1, which—is thus located in the primary cell C42, reads signal strengths on control channels transmitted by different base stations in the system, so as to find the most favorable base station to which a connection can be set-up.

The mobile MS1 establishes that the primary base station B42 is the station from which the strongest signal strength has been received.

The mobile adjusts to the same channel as that used by the primary base station B42.

The mobile sends an access request message ARM on the selected frequency.

The access request message ARM is captured by all base stations handled by the first mobile switching center MSC1 and shown in FIG. 2, and four of the base stations in the cell areas C47, C48, C53 and C54 handled by the second mobile switching center MSC2.

The identity ID of the mobile MS1, the time t42, t48 at which the message was received by the different base stations, and the power S42, S48 with which the message ARM was received in respective base stations B42, B48 are registered in the storage locations MS2, B48 of all base stations B42, B48 that captured the access request message ARM.

The primary base station B42 accepts the access request made by the first mobile, and prepares to set up a connection between the base station B42 and the mobile MS1.

The primary base station B42 reads a value of the power Put at which the mobile MS1 transmits.

The value of the transmission power Put of the first mobile MS1 is stored in the storage location M424 of the primary base station B42, together with the aforementioned stored information ID t42 and S42.

The above steps are repeated over a predetermined period of time, for all access request messages that are sent by different mobile stations MS1, MS2 and MS3 located in the mobile telecommunications system.

Information stored in the storage locations MS2, B48 during said predetermined time period i sent from the base stations B42, B48 to the mobile switching centers MSC1, MSC2, MSC3. Each switching center receives and stores in respective storage units MS1, MS2 information received from those base stations handled by the switching center. The storage unit that stores the transmitted power Put also indicates the receiver to which the mobile has primarily directed its transmissions of the access request message ARM.

The control unit CTR in the central unit CU commences to fetch the values stored in the local storage units MS1, MS2.

Figure 4A:
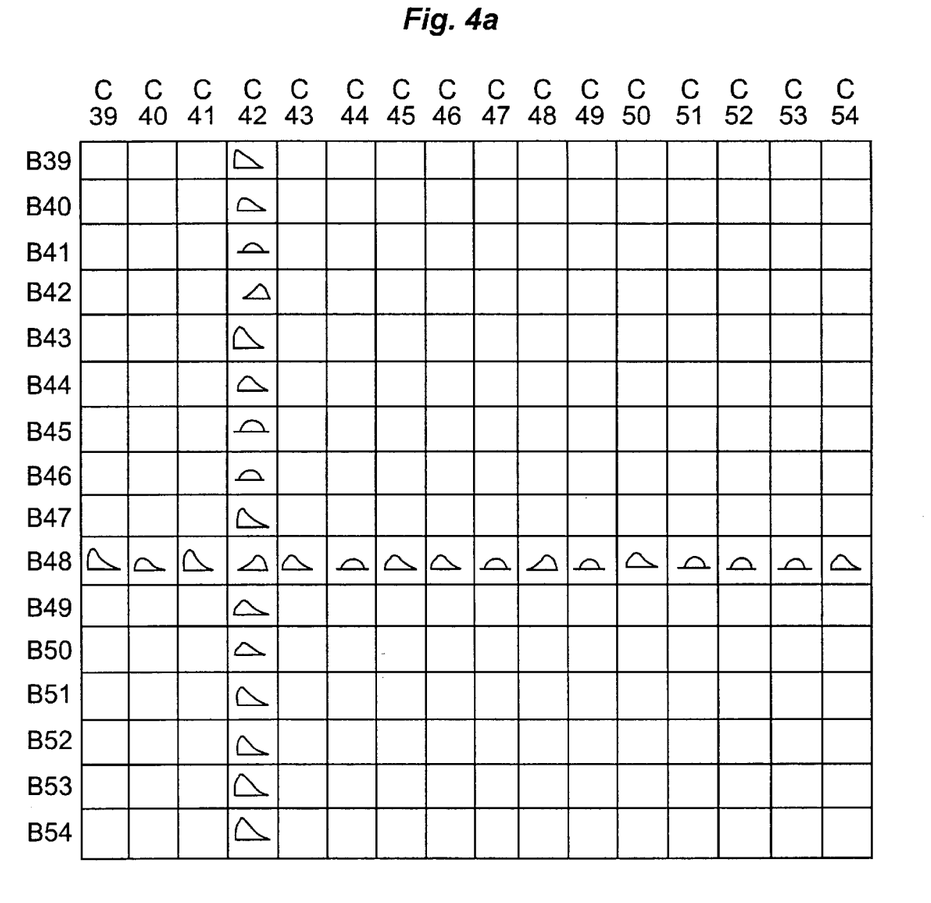
FIG. 4a illustrates transmitter/receiver relationships in the form of matrix-contained histograms, these histograms having been generated in accordance with the invention.

The control unit CTR compiles and calculates the amplification for each signal received. This amplification is calculated as the quotient between received power S42, S48 and transmitted power Put. The time t42, t48 read for each received value is used to enable received power to be combined correctly with the correct transmitted power Put. The calculated values are stored in the matrix store G. Matrix storage will be explained below in more detail with reference to FIG. 4. The method is thereafter repeated and the matrix constantly filled in this way with new relevant values of relationships between transmitters and receivers in the radio system.

One conceivable alternative to the afore described embodiment is for each base station to scan systematically all control channels in the system, instead of receiving continuously signals from all control channels. Another conceivable alternative is to transport the information in each received signal directly to the matrix store G without first storing the information intermediately in other storage units.

FIG. 4a illustrates the construction of the matrix store G in the central unit CU. The matrix store G includes different storage locations each of which represents, on the one hand, a receiver that has received the access request message to be stored and, on the other hand, a cell in which the transmitter' that has sent the access request message is located. One axis of the matrix store shown in FIG. 4a is comprised of the base stations B39–BS4 that have received a respective access request message ARM, and the other axis is comprised of cells C39–CS4 in which transmitters were located when the access request message ARM was sent. The values stored in the matrix are the calculated amplification values, $g\hat{}42$ and $g\hat{}48$. The amplification values are thus stored in respective storage locations in the form of histograms of a type that will be made more apparent hereinafter with reference to FIG. 4b. In FIG. 4a, all histograms that belong to the secondary base station B48 have been marked with a row of histogram curves in each base/cell pair, where the secondary base station B48 constitutes the base station in each base/cell pair, whereas the cell varies for each storage location. In FIG. 4a, all histograms that belong to the primary cell area C42 have been marked with a column of histogram curves. The histograms marked in FIG. 4b with rows and columns respectively constitute only some of the total number of histograms in the matrix. A histogram is stored in all base/cell pairs in the matrix, although only the rows and columns have been drawn in the Figure in order to simplify the Figure.

Figure 4B:
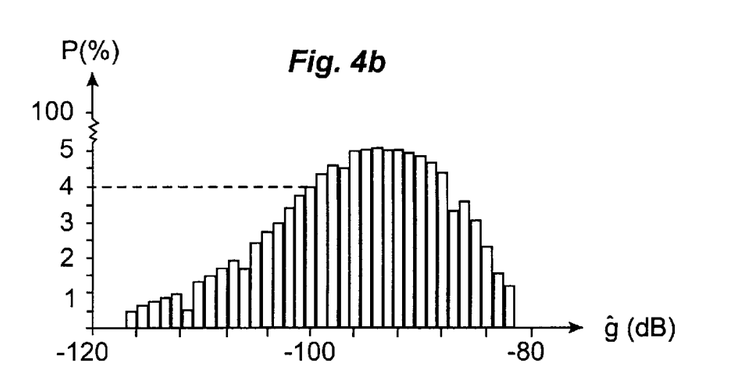
FIG. 4b shows a histogram in more detail.

FIG. 4b shows a histogram in more detail. The histogram chosen for the FIG. 4b illustration is the histogram found in the G-matrix in the storage location which combines the receiver B48 and the cell C42. The X-axis of the illustrated diagram shows amplification expressed in dB. The amplification g A can assume a value between –120 dB and 80 dB. The Y-axis of the diagram shows the probability, in percentage, of a certain amplification value. The histogram in FIG. 4b includes stacks of mutually different heights. The combined height of the stacks is 100%.. The height of each stack illustrates the probability of a receiver receiving from a transmitter in a cell precisely the amplification represented by the stack. Each stack has a width of 1 dB. In the illustrated diagram, the probability of a base station B48 obtaining the amplification value –100 dB for a signal received from a transmitter in cell C42 is 4%. When an amplification value that represents, e.g., –110 dB is sampled, the stack corresponding to the value is raised in the illustrated case by a predetermined parameter corresponding to 1/100th of a percent. The method proceeds in accordance with the above in the start-up phase, before the total height of the stacks reach 100%. When the combined height of the stacks has reached 100%, the histogram is normalised as the values are collected. After sampling an amplification value, the stack that represents this value is raised by the predetermined parameter, i.e. by 1/100th of a percent. All stacks are then lowered proportionally, such as to lower the combined height of the stacks by 1/100th of a percent. One conceivable alternative to the illustrated method of generating a histogram is to have a start distribution already at the beginning of the start-up phase and to normalize the histogram already at this point.

Figure 5:
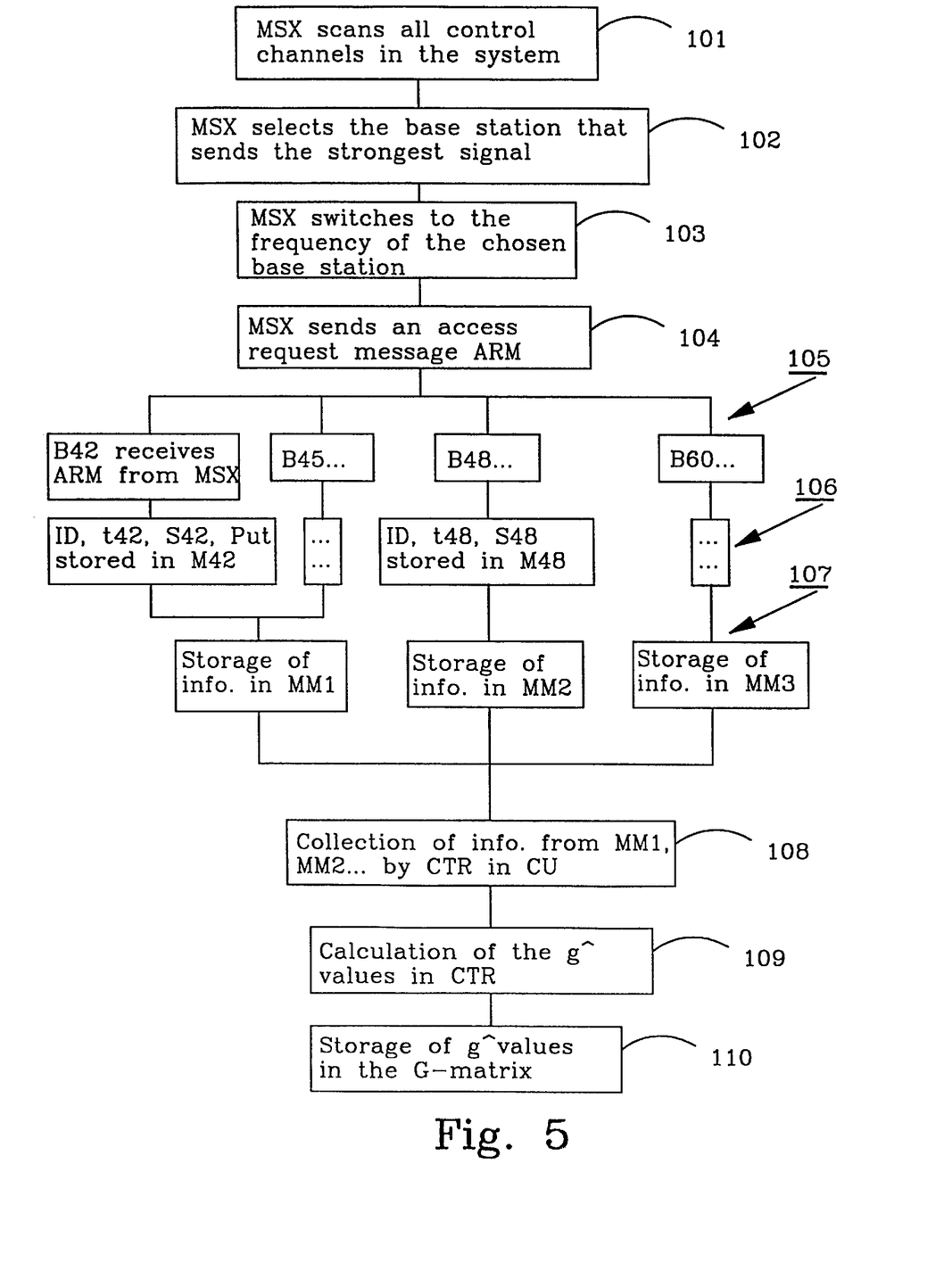
FIG. 5 is a flowchart illustrating an inventive method of compiling the relationship of a transmitter with different receivers in a mobile telephone system.

FIG. 5 is a flowchart illustrating the method described above with reference to FIG. 3. The flowchart shows the procedural steps significant of the invention. The method is carried in accordance with FIG. 3 and in accordance with the following steps:

The mobile MSX scans all control channels in the system, according to block 101. The mobile has been referenced MSX in FIG. 5, in order to indicate that one of all mobiles in the system is meant.

The mobile selects the base station that transmits the most favorable signal on the scanned channels, in accordance with block 102.

The mobile sets-in the control channel of the selective base station, in accordance with block 103.

The mobile sends an access request message ARM on the set control channel, in accordance with block 104.

All neighboring base stations receive the access request message ARM from the mobile MSX, in accordance with the block marked with a reference arrow 105.

The identity ID, the time t42 of receiving the message, and the received power are stored in the storage location MS2 of respective base stations, in accordance with block 106. The transmitted power Put of the mobile is also stored in the base station B42 whose control channel has been chosen by the mobile.

The information contained in the storage locations of the base stations is forwarded to the storage unit MS1, MS2, MM3 belonging to the mobile switching center that handles respective base stations, in accordance with reference arrow 107.

The control units CTR in the central unit CU collects stored information from the storage units of respective switching centers, in accordance with block 108.

The amplification values $g\hat{}$ are calculated by the control unit CTR, in accordance with block 109.

The calculated amplification values are stored in the Gmatrix in accordance with block 110.

As it may be appreciated, the above described embodiment uses the received signal measurements for determining attenuation cell relations in terms of amplification values. Sometimes, however, it is desirable to express the cell relations in terms of carrier to interference (C/I) ratios.

It is, of course, possible to use the amplification values to calculate other cell relation measures. For example, the amplification values calculated for access messages from mobiles in neighboring cells may be used to compute interference values for traffic in a cell being serviced by a particular base station. According to one aspect of the present invention, the downlink cell relations are expressed in terms of C/I ratios using the amplification values derived by uplink signal strength measurements, without actual downlink signal strength measurements. Because of relatively narrow frequency spread of the uplink and downlink spectrum, it is assumed that the uplink amplification values also correspond to the downlink amplification values. That is, the amplification values, which are derived in the uplink direction, also represent the downlink amplification values in the downlink direction. Under this assumption, the down link cell relations are estimated in terms of C/I ratios based on the uplink amplification values and known power outputs of the base stations. Then, signal strength C can be measured by the base station for the traffic. The signal strength C can then be combined with the interference from transmissions in surrounding cells to achieve a carrier to interference ratio (C/I). This C/I ratio may be stored in a matrix in lieu of, or in addition to, the amplification values. Thus, for all pairs of cells, we have distributions describing the C/I situation in the downlink and/or uplink in one of the cells given that the other is using the same frequency, and vice versa.

Downlink I may be estimated by multiplying a corresponding uplink amplification value by the known base station power output. Downlink C may be estimated by multiplying a corresponding uplink amplification value by the known base station power output at a cell. Alternatively, downlink C may be a reported measure of signal strength at the mobile stations. The necessity of measuring C and I simultaneously to obtain a correct downlink distribution, due to the correlation between C and I in the downlink, should also be noted. For the uplink, however, C and I distributions can, for example, be collected separately and subsequently convoluted. This is because the distributions of uplink carrier strength and interference are uncorrelated. Transforming the collected information on co-channel C/I into information on adjacent channel C/I can be accomplished easily by decreasing the interference by an appropriate factor.

Often, expansion of a cellular phone network results in the creation of new cells on a gradual basis through installation of new base stations. Consequently, it is desirable to estimate cell relations for the new cells, with respect to existing cells, before the new cells become active. The method described above can, of course, be modified to handle this situation. The crucial point is to determine which mobile stations would be in the "virtual" cell (i.e., non-active, new cell) if it were active. Once these mobile stations have been identified, base stations in the actual cells can measure the signal strength of the random access bursts associated with these mobile stations. The signal strength measurements can then be used to compute attenuation or C/I distributions which, in turn, can be attributed to the virtual cell.

To determine which of the mobile stations will belong to the virtual cell once it becomes active, we can use the Mobile Assisted HandOver (MAHO) measurements performed by the mobile stations. An antenna at the place of the virtual base station transmits on a frequency included in the MAHO-lists of all mobile stations in the area, and subsequently the MAHO-measurements are reported to a central unit. Although no mobile stations will actually connect to the virtual base station, the central unit can determine which mobile stations would connect if the virtual cell were active, simply by considering standard cell selection criteria. One should note, of course, that mobile stations that are currently located in areas not covered by existing cells will not be used in the measuring process.

If we are interested in C/I relationships, C can be estimated by the MAHO measurements or by signal strength measurements and possibly decoding by a device in the position of the virtual base station.

It is of course possible to perform uplink measurements of random access bursts from mobile stations in other cells with a device (e.g., a test base station) located in the place of the new base station. The MAHO-measurements suggested above will then be used to avoid including measurements from mobile stations that will be connected to the virtual cell once it is active.

It will be understood that the illustrated and described embodiments may be varied in several respects without departing from the inventive concept. It will also be understood that the invention is not restricted to the described and illustrated embodiments thereof, and that modifications can be made within the scope of the following Claims.

What is claimed is:

1. A method of compiling the relationships of transmitters to receivers in a radio system that includes at least two receivers and at least one transmitter located in at least one radio coverage area of the receivers, wherein in respect of at least one single transmitter the method comprises the steps of:

sending on a transmission channel allocated to said transmitter a signal of known power;

measuring in at least one of the receivers the power received from the transmitted signal, it being guaranteed that the signal will be a solitary signal upon reception;

calculating an amplification factor associated with the signal received in the receiver, wherein the amplification factor comprises the factor by which the transmitted signal strength is multiplied in order to obtain the received signal strength; and storing the calculated amplification factor as a histogram, in which the X-axis represents amplification factor and the Y-axis represents the number of collected values having a certain amplification value, in a storage location in the radio system.

2. A method according to claim 1, characterized by calculating the amplification factor as the quotient between received power and transmitted power.

3. A method according to claim 1, characterized by the further step of:

establishing the identity of the receiver to which the transmitter primarily directed its transmission of the signal.

4. A method according to claim 1, characterized by repeating the method in respect of other transmitters in the radio system.

5. A method according to claim 1, in which the histogram is stored in a matrix memory, wherewith the histogram is tied in the matrix memory to a receiver that has received signals from which the values in the histogram have been generated, and also tied to a radio coverage area in which different transmitters were located at the time of transmitting said signals.

6. A method according to claim 1, in which the histogram is normalised in conjunction with storing new amplification values.

7. An arrangement for compiling transmitter-to-receiver relationships in a radio system that includes at least two receivers and at least one transmitter located in at least one of the radio coverage areas of the receiver, said arrangement including:

means for transmitting a signal of known power on a transmission channel allocated to the transmitter;

means for measuring in at least one of the receivers the power of the received transmitted signal, said signal being guaranteed to be a solitary signal upon reception;

means for calculating an amplification factor that is associated with a signal received in the receiver, said amplification factor being calculated as the quotient between received power and transmitted power wherein the amplification factor comprises the factor by which the transmitted signal strength is multiplied in order to obtain the received signal strength; and means for storing the calculated amplification as a histogram, in which the X-axis represents amplification factor and the Y-axis represents the number of collected values having a certain amplification value, in a storage location in the radio system.

8. A method for determining cell relations between a plurality of cells in a cellular communication system comprising the steps of:

transmitting uplink access bursts from one or more mobile stations on random access channels assigned to the cells;

measuring received signal strengths of the uplink access bursts at one base station; and processing received signal strength measurements made in response to the transmission of the uplink access bursts to determine cell relations among the cells in terms of a matrix of distributions of a cell relation parameter derived for any pair of cells.

9. The method claim 8, wherein the cell relation parameter corresponds to uplink amplification values.

10. The method of claim 8, wherein the cell relation parameter corresponds to carrier to interference ratio.

11. The method of claim 10, further comprising the steps of:

measuring received signal strength of the uplink access bursts at a plurality of base stations for each of the one or more mobile stations; and generating one or more downlink carrier to interference ratio values for each of the one or more mobile stations as a function of the received signal strength measurements taken at the plurality of base stations.

12. A method for determining cell relations between a plurality of cells in a cellular communication system comprising the steps of:

transmitting uplink access bursts from one or more mobile stations on random access channels assigned to the cells;

measuring received signal strengths of the uplink access bursts at one base station; and processing received signal strength measurements made in response to the transmission of the uplink access bursts to determine cell relations among the cells in terms of a matrix of distributions of a cell relation parameter derived for any pair of cells, wherein the cell relation parameter corresponds to carrier to interference ratio, and wherein the method further comprising the steps of:

storing the received signal strength measurements of the uplink access bursts associated with mobile stations located outside a cell corresponding to the one base station, wherein the stored signal strength measurements are considered by the one base station to be measurements of interference;

storing signal strength measurements associated with a carrier signal transmitted from the one base station; and determining a distribution of carrier to interference ratio values as a function of the stored signal strength measurements associated with the mobile stations located outside the cell corresponding to the one base station and as a function of the signal strength measurements associated with the carrier signal transmitted from the one base station.

* * * * *